April 20, 1937. W. F. ZIMMERMANN 2,077,730
BALANCED HELICOIDAL CHANGE SPEED DRIVE FOR SHAPERS
Filed Nov. 7, 1935 2 Sheets-Sheet 1

INVENTOR
William F. Zimmermann
BY
Albert F. Nathan
ATTORNEY

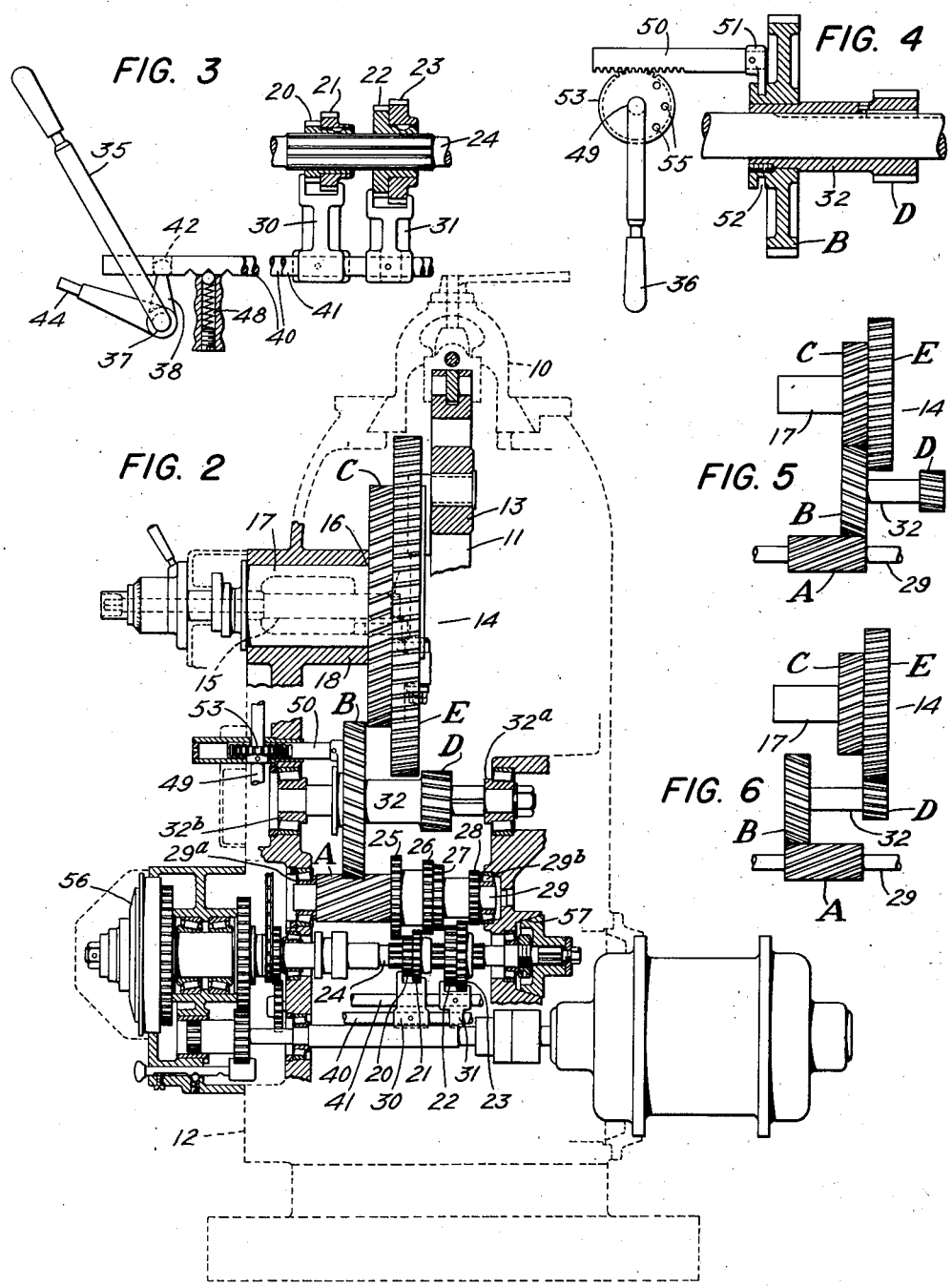

Patented Apr. 20, 1937

2,077,730

UNITED STATES PATENT OFFICE 2,077,730

BALANCED HELICOIDAL CHANGE SPEED DRIVE FOR SHAPERS

William F. Zimmermann, Maplewood, N. J., assignor to Gould & Eberhardt, Newark, N. J., a corporation of New Jersey Application November 7, 1935, Serial No. 48,680

8 Claims. (Cl. 74—342)

The invention relates to improvements in shaping machine driving transmissions and particularly to that portion of the transmission having to do with the propelling of the shaper ram on its slow forward and rapid return movement at various preselected rates of speed.

The primary object is to render available a transmission that is exceptionally powerful and quiet in operation and a transmission in which all of the end thrusts upon the ultimate driven gear are taken by the main bearing.

In my prior Patent #1,846,780, there is disclosed a shaper drive in which a double crank gear, of the spur type, is the ultimate gear in the train. A two gear sliding unit is also disclosed which is adapted to be meshed selectively with either of the crank gears.

A spur gear drive, however, although it facilitated the use of sliding gear units, lacked continuity of tooth contact, wore rapidly and soon became noisy and unsatisfactory in operation. The wear was due to the enormous pressures upon the meshing teeth and the substantially continuous sliding movement between the teeth as they went into and out of action. The wear was noticeably greater along the sides of the teeth adjacent the tops and bottoms where the largest portion of the sliding action occurred.

The development of helical gears overcame to a great extent the difficulties and problems arising in spur gearing. In such gears the helix angle is preferably arranged so that two or more teeth are in constant mesh at any given time and therefor the load is distributed proportionately over a larger number of teeth. At the top and root of the teeth the amount of wear is not nearly as great as in the spur gear design and furthermore, with the helical gears the meshing teeth are constantly in engagement along the pitch circle of the gears, which is at the point where no relative sliding action takes place between the teeth. The results of such a design was to concentrate the load on the transmission to the pitch circle of such gears, the gears ran quiet and had a longer life. However, due to the angularity of the teeth, the driven gear displays the tendency to move laterally along its axis in one direction only, depending upon the angle of the helix and direction of rotation. That is to say, in helix gearing there is an axial thrust in one direction at all times and unless the gear or gears are adequately supported against such end thrusts, they promptly slide out of the engagement. With herring-bone gears the end thrust of one portion of the face of such a gear was opposed by the counter-thrust of the other portion. Such gears, however, cannot be used in transmissions involving the use of a sliding gear for the reason that the gears are mechanically locked.

The primary object of the present invention is to reconcile the advantages of spur, helical, and herring-bone gears into a single coherent drive and to render available a variable speed transmission involving the use of sliding helicoidal gears and in which the end thrusts upon the final driven gear or gears act in one direction only, and the thrusts upon the intermediate sliding gear unit kinetically balanced in such a manner as to eliminate the need for auxiliary locking devices to hold the shiftable member in position.

The invention is particularly useful in and may be best understood in connection with a shaping machine. Such machines are provided with a reciprocable ram that is propelled slowly forward and rapidly back again by means of a slotted lever and a cooperating crank pin.

The relation between the lever, ram and crank pin, is such that on the forward stroke, the crank pin is operating in that portion of the slot of the lever remote from the fixed pivot, while on the rapid return stroke of the ram, the crank pin is operating in that portion of the slot of the lever adjacent the fixed pivot. This arrangement, it will be seen, provides for a slow advance and a rapid return movement of the ram accompanied by relatively sudden and quick reversals.

In the shaping machine disclosed herein, the ultimate drive gear for the crank pin is a large two gear unit supported in bearings at one side of the gear only. This unilateral support is resorted to in view of the necessity to have a variable throw crank and also for the reason that the oscillating lever moves across the opposite face of the crank pin gear in reciprocating the ram.

The two-gear crank pin gear is provided for the purpose of effecting coarse changes in the speed of the ram without the necessity of using additional intermediate gears in the train. The arrangement has the advantage also of affording a condition wherein the only element affected by the coarse changes is the final element, and the gearing, ahead of such element, is thereby caused to run at a substantially constant and uniform speed which is never excessive.

Finer changes in ram speed are effected, in the present construction, by a primary change speed gear set, affording four changes in speed, in series with the two coarse changes above mentioned and making a total of eight different speeds for the ram. Preferably the finer speed changes are located at the power input end of the transmission so that the shock on the remainder of the drive incident to changing from one fine speed to another is small relative to the shock resulting if the coarse changes in speed were at that point in the train.

In machine tool drives of this character, each time the crank pin passes an axial plane perpendicular to the longitudinal axis of the pivoted lever, the direction of oscillatory motion of the lever is reversed. And if the lever is propelling a massive heavy part, as for example a shaper ram, the quick reversals of the lever followed thereafter by a change in lever arm, places severe stresses upon the intermediate shiftable gear and the gear shifting apparatus.

A further object of the present invention is to render available a silent powerful drive of the character involving helicoidal gears in which all of the end thrusts upon the final double gear in the drive are taken by the one bearing that is provided, and in which the end thrusts upon the intermediate sliding gears are so balanced as to relieve the same of all undue axial thrusts and oscillatory reactions incident to reversals in ram stroke that ordinarily would necessitate auxiliary clamping means to hold the gears in position.

In realizing the objects of this invention, it is proposed to arrange five helicoidal gears in the secondary or coarse speed change set of a transmission, upon parallel fixed axes. The first gear of the set is a relatively long driving pinion, arranged constantly to mesh with one gear of a two-gear sliding unit. One of the gears of the sliding unit is proportioned to mesh selectively with one of the gears of a double gear crank wheel and the other gear of the unit with the other gear of the crank gear wheel. All of the gears are of the helicoidal type, the teeth upon the driving pinion and preferably on both gears of the crank wheel, having a left hand helix angle and the teeth on the intermediate gear unit having a right hand helix angle.

With the drive pinion running in a clockwise direction, as viewed from the right hand end thereof, the end thrust upon the intermediate gear will accordingly be toward the left. However, since the intermediate unit is also meshing with one of the gears of the crank wheel, the end thrusts occasioned by one set of meshing teeth are counteracted by the counter thrusts of the second set of meshing teeth. The angularity of the helix on all of the gears is so made that the result of the counteracting end thrusts on the gears is to urge the final gear or crank gear in the direction of its bearing, and to relieve the intermediate sliding gear of all undue axial stresses. With such a balancing of forces there is no oscillation of the gears set-up at the reversals in stroke and the gear shifting mechanism requires no auxiliary locking devices to hold the sliding gears in position.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 of the drawings illustrates a shaping machine embodying principles of this invention.

Figure 2 is a sectional view taken through the axes of the various elements of the ram driving train.

Figure 3 is a detail of the front gear gear-shift mechanism.

Figure 4 is a detail view of the back gear gearshifting mechanism.

Figures 5 and 6 are diagrammatic views illustrating different positions of the gears designed to produce certain shaper speed combinations, and each having a balanced intermediate sliding gear.

Figure 1:
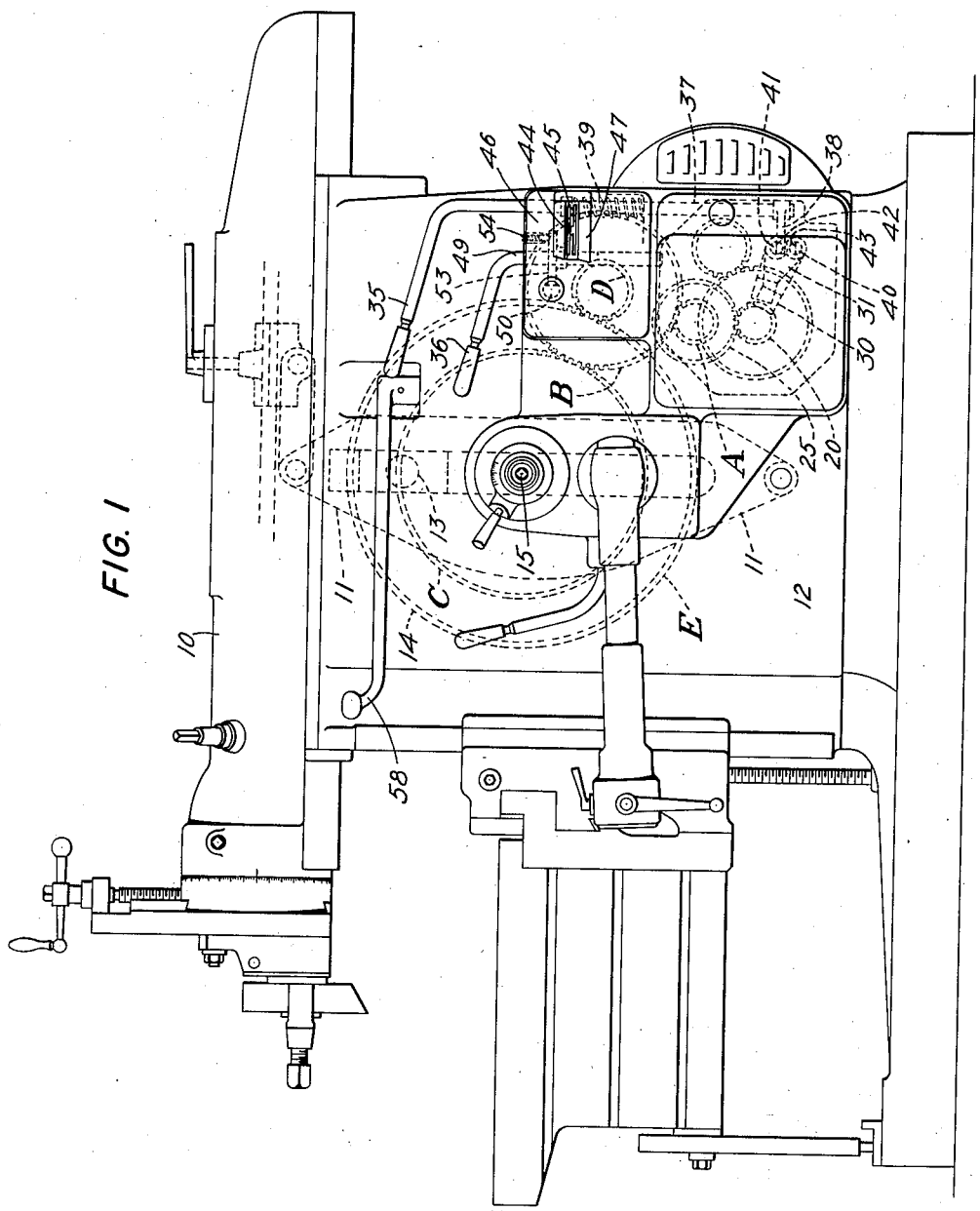

Referring more particularly to the drawings Figures 1 and 2 thereof illustrate a typical embodiment of the invention as applied to the transmission of a shaping machine.

The function of a shaper generally is to plane off a surface of a workpiece by a tool held in a relatively reciprocating ram or tool carrier 10. The means for reciprocating the ram in this instance, comprises a slotted lever or pitman 11 pivoted to the ram and also to the base 12 of the machine. An adjustable throw crank member 13 cooperates with the slot in the pitman, and upon rotation, oscillates the pitman slowly forward and rapidly backward. These motions in turn are transmitted to the ram and the tool carried at the forward end thereof.

To provide a means for changing the length of stroke of the ram, the crank pin 13 is arranged to occupy any one of various radial positions on the bull wheel 14 and may be shifted by means of adjusting screw 15 that is available for operation at the operator's side of the machine. Since the pitman 11 and the crank pin 13 move across the face of the bull wheel 14, the bull wheel has one large bearing 16 at the side thereof removed from the crank pin and rocker arm 11.

As shown in the drawings the bearing 16 for the bull wheel 14 is provided in part by the surface of an extended hub 17 of the wheel 14 and in part by a properly bushed portion 18 of the main frame or casting of the machine.

It is important therefore that the bull wheel be maintained and continually urged firmly, yet freely rotatable, in its seat in the only bearing that may be provided in such a construction.

The drive to the bull wheel comprises two serially arranged speed change transmissions, a primary speed change set yielding four fine changes in speed, and a secondary speed change set yielding two coarse changes in speed, making a total of eight different speeds to the ram 10.

The first or primary speed change set is composed of four sliding gears 20, 21, 22, and 23, splined to a motor driven shaft 24, arranged to cooperate with four gears 25, 26, 27 and 28 keyed or otherwise secured to a parallel shaft 29. Suitable gear shifting means indicated generaly by the numerals 30 and 31 are provided for selectively positioning the sliding gears whereby power is transmitted from shaft 24 to shaft 29 at any one of four different speeds.

The power conveyed to the shaft 29, hereinafter called the pinion shaft, passes to the secondary speed change transmission, about which this invention is primarily concerned.

In the arrangement disclosed the secondary transmission yields two additional changes in speed, which are relatively coarse changes as compared with those effected by the primary set. The secondary set is arranged at the output end of the drive so that the coarse changes in speed produced thereby effect only one further gear element, to wit, the large crank wheel 14. Any shock incident to changing from a relatively low to a relatively high speed, is felt by comparatively few parts in the drive and furthermore all the gearing and shafting ahead of the secondary speed change mechanisms may be driven at a substantially constant uniform speed that never is excessive.

The secondary gear train comprises essentially a pinion gear A, journaled in radial and thrust bearings 29a and 29b against axial movement in either direction; an intermediate sliding gear unit 32 providing gears B and D, and the crank wheel 14, which is provided with two gears C and E.

In prior constructions the gears of the train just described, have been of the spur gear type and although seemingly suitable for the purpose, proved unsatisfactory in use for various reasons, some of which have been set forth above. Another disadvantage found in the spur gear constructions was that the slight end play in the crank gear mounting, increased in service, the results of which, were to increase the overhang of the large driving wheel and impose severe bending stresses upon the wheel hub and bearings that reflected in the character of the tooling operation performed.

The present invention aims to overcome that unsatisfactory condition and to render available a drive so arranged that a resultant of the reacting forces tends normally to hold the bull gear firmly against its bearing. In this way any wear between the engaging forces of the wheel and bearing is constantly taken up in a direction maintaining the wheel overhang at a minimum fixed value.

To that end, it is proposed to provide helicoidal gear teeth upon the peripheries of the several gears of the secondary speed change set. It is important here to note that both of the bull gears C and E have the helix angle extending in the same direction. In the embodiment illustrated both large gears have a "left-hand" spiral arranged to be meshed selectively with gears B and D respectively of the sliding unit 32. The gears B and D of the sliding unit each have right handed helical teeth, and the former arranged to mesh continuously with the long left-handed helical pinion gear A secured to the pinion shaft 29.

The selection of the proper helix angle for the teeth of the gears of the change speed back-gear train is of vital importance in achieving the objects and advantages sought by the present invention. The helixes cannot be picked at random and be expected to produce a balanced condition of axial thrusts upon the sliding gear, as such selection would result in an oscillatory and unbalanced condition in the sliding unit requiring auxiliary locking devices and other attendant disadvantages.

The manner of arriving at a stable condition in axial thrusts upon an intermediate sliding gear will now be set forth. Referring to the diagrammatic Figure 5 of the drawings the gears represented as A, B, and C, are illustrated as engaged (shaper in high gear) and the axial thrust upon the gear B, imparted by gear A, is exactly equal but opposite to the axial thrust imparted to gear B as it drives the gear C. In consequence gear B is in a state of axial equilibrium, and regardless of helix angle, no provision for thrust is necessary to secure the gear B in that position.

However, difficulty is encountered when it is desired to drive through gears D and E (shaper in low gear) for with the unit 32 in this position (see Figure 6), and assuming that the helix angles were the same on all gears, the intermediate gear no longer is in axial balance because of the difference in sizes and changes in tooth load. The torque on a gear is the product of the tangential tooth load and the pitch radius, but the torque in inch pounds on gear B is the same as on gear D. If the diameter of gears B and D were the same, helix angles could also be the same and the axial thrusts on gears B and D would cancel each other.

Gear D, however, in the present example, is the smaller of the two and therefore the tooth load is increased directly as the ratio of pitch radius of B to the pitch radius of D increases. And since tooth load times the tangent of the helix angle is the measure of the axial thrust, the helix angle of gear D must be less than that of gear B by an amount sufficient to produce a balancing of the axial thrusts in the sliding unit 32. Accordingly, the helix angle to be used for the teeth of gear D is the angle whose tangent equals the product of the helix angle of the teeth of gear B and the pitch radius of gear D divided by the pitch radius of gear B. Expressed algebraically:

$$\tan \text{angle } d = \frac{r \tan \text{angle } B}{R}$$

where, $d$ = helix angle of gear D
$B$ = helix angle of gear B
$R$ = pitch radius of gear B
$r$ = pitch radius of gear D In the present example the minimum helix angle that can be used upon a 24″ shaper having a 126 tooth gear and 18 tooth driver, and still have a minimum of two teeth in action is 7° 5′. Substituting this figure in the above equation for $d$, the equation may be solved to determine the helix angle of gear B necessary to produce a balanced condition of the axial thrusts in the sliding unit.

With the hand of helicoidals A and E arranged as indicated, the resultant of the forces are as follows: With the pinion gear A running clockwise (as viewed from the right hand end) the helix angle of meshing teeth of the gears A and B is such as urge the gear B toward the left. However, if gear B is in mesh with the teeth of gear C, the thrusts between the latter two gears reacts in an opposite direction from the thrusts between gears A and B and produces a balanced condition of the end thrusts on the gear B and therefore no positive locks are required to hold the sliding gear in either effective position.

A reversing of the initial drive shaft or a reversal in direction of the helixes will, of course, result in a reversal in the direction of the preponderating force, if it is desired to have a different reaction. The preferred form of helicoidal drive is, however, that which places the gears in kinetic balance as above explained and thus eliminates the oscillation tendencies and axial pounding upon reversals and the necessity for positive locking arrangements or complex gear shifting devices.

The gear shifting mechanism for the gears of the primary and secondary change speed sets may follow conventional design. In the instant disclosure, however, the speed control means comprises a primary control lever 35 that is movable horizontally in two planes, and a secondary lever 36 that moves in one plane only.

The primary lever 35 connects with a vertically arranged shaft 37, the lower end of which is provided with a laterally projecting finger 38. The shaft 37 is vertically movable and normally maintained in its upward position by means of a spring 39.

The sliding gear units 20—21 and 22—23 of the primary speed change set, are provided with shifting forks 30 and 31 secured to shafts 40 and 41 respectively. These two shafts have their axis arranged in the same vertical plane and are provided with inwardly faced notches 42 and 43.

The notches of the two shafts are opposite each other when the respective sliding gears are in their intermediate or neutral position, and are arranged to cooperate with the free end of the finger 38 on the control shaft 37. The spacing of the fork shifting shafts is such that the finger may pass from one notch to the other only when both notches are in alignment. When the gears are in neutral the control shaft may be depressed or elevated to engage the finger 38 with either notched shaft and rotated the amount required to effect meshing of the proper gears of the primary gear set.

The neutral positioning of the gears is assured in every instance, by a second finger 44 projecting from the control shaft 37, which projects through a horizontal H slot 45 in the housing 46. Indicator plates 47 above and below the H slot cooperate with the end of the finger 44 in indicating the speeds available.

By this arrangement of the controls, a positive acting safety device is incorporated which prevents simultaneous shifting or operation of both gear sets of the primary train.

Spring pressed detent means 48 may be used to hold the fork shifting shafts 40 and 41, and the sliding gears operated thereby, in their adjusted positions.

The control means for the sliding unit 32 of the secondary and helicoidal speed change mechanism, comprises the lever 36, control shaft 49 and a fork shifting shaft 50. The shaft 50 is provided at its inner end with a shoe 51 that seats within an annular recess 52 provided on the hub of the sliding unit 32. The outer end of the fork shifting shaft is provided with rack teeth adapted to mesh with the teeth of a gear 53 secured to the control shaft 49. Detent means in the form of a spring pressed plunger 54 and notches 55 in the side of the gear 53 are provided so that the control mechanism and sliding gear 32 does not vibrate out of position.

It is to be noted here that because of the balancing of the end thrusts upon the helicoidal sliding unit 32, afforded by the present construction, there is no need for auxiliary locks or clamps to hold the helicoidal gear unit 32 in either of its operating positions.

In effecting a change in speed of the ram, the machine is ordinarily stopped by means of the main clutch 56 and brake 57 and control lever 58. This relieves the sliding helicoids of all torsional stresses and they are free to turn relative to each other the slight amount required to fully engage the teeth of one of the helicoidal gears of the sliding unit with the selected cooperating crank gear. After the sliding gear has been positioned, the power is again rendered effective by the master clutch 56, and the balancing of the end thrusts upon the sliding gear, holds the latter in its shifted position. And in either position the resultant of the end thrusts upon the helicoidal gear acts in a direction tending to urge the bull gear wheel 14 in the direction of its bearing.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be comprehended within the meaning and range of equivalency of the following claims.

Having thus revealed this invention I claim as new and desire to secure the following combinations and elements, or equivalents thereof, by Letters Patent of the United States:

1. In a machine tool device the combination of a supporting frame structure; a member reciprocably mounted thereon; drive means for said member including a power source, a driving pinion, a driven gear and an intermediate slidable gear unit having a large gear adapted to mesh constantly with said pinion and a small gear adapted to mesh selectively with said driven gear, bearing means for supporting said driven gear at one side of its plane of rotation, bearing means for supporting said driving pinion at both sides of its plane of rotation; said slidable gear unit being journaled for free rotation and axial movement on an intermediate stub shaft; means for producing a balanced condition of the axial thrusts in said intermediate sliding gear unit comprising helicoidal gear teeth on all of said gears, the helix angle of the teeth of said pinion and its cooperating gear of said gear unit, and the helix angle of the other gear of said unit and its cooperative driven gear being proportioned with respect to their pitch diameters to produce equal and oppositely acting thrusts on said intermediate unit; manually operable means for sliding said intermediate gear unit selectively into and out of engagement with the teeth of said driven gear while maintaining said engagement with the teeth of said driving pinion; and means operatively connecting said driven gear with said reciprocable member to reciprocate said last mentioned member when said gear unit is in engagement with said driven gear.

2. A ram driving variable speed transmission for a shaping machine combining a large crank gear and a small crank gear; a shiftable intermediate idler gear unit having a large gear and a small gear thereon each adapted selectively to engage one of said crank gears for changing the ram speed; a wide faced driving gear constantly meshing with the large gear of said shiftable idler gear unit, all of said gears having helicoidal teeth thereon arranged to afford a minimum of two teeth in action between any two cooperating gears; and means for shifting said intermediate gear unit selectively to either of its effective positions; the helix angle of the teeth of the gears of said shiftable idler gear unit and their respective cooperating gears being proportioned to maintain said shiftable idler unit in a state of axial balance and thereby automatically in either of its effective positions independently of said shifting mechanism.

3. The five gear change speed helicoidal gear transmission comprising a wide-faced drive pinion; an intermediate slidable gear unit comprising a large gear adapted constantly to mesh with the said drive pinion and a small gear; a driven gear unit comprising a relatively small gear adapted to mesh with the said large gear of said slidable unit and a relatively large gear adapted to mesh with the said small gear of said slidable gear unit; means for shifting said intermediate unit to a position effective to drive said driven gear unit selectively through the large gear thereof or through the small gear thereof; and helicoidal gear teeth on all of said gears, the tangent of the helix angle of the teeth on said small gear of the intermediate unit and its cooperating large gear of said driven gear unit, being equal to the tangent of the helix angle of the large gear of said intermediate unit, times the pitch radius of the small gear of said intermediate unit, divided by the pitch radius of the large gear of said intermediate unit, thereby to produce a balanced condition of the axial thrusts on the intermediate slidable gear unit irrespective of the effective position to which it is shifted by said shifting means.

4. In a machine tool the combination of a supporting frame member; a member reciprocable thereon; driving means for said reciprocable member including a two gear crank gear unit operatively connected with said member, a slidable two gear idler gear unit having gears of different sizes adapted to mesh selectively with the gear of said crank gear unit, said idler gear unit being freely rotatable and axially movable on an intermediate shaft, and a third gear for constantly driving said slidable two gear unit when the latter is shifted to either of its effective positions with respect to the gears of said crank gear unit; and means maintaining said slidable gear unit in kinetic equilibrium in respect to the axial thrust induced therein when said unit is positioned in either of its effective positions, said means including cooperating helicoidal gear teeth on all of said gears with the helicoidal teeth on the smaller gear of said slidable unit at a helix angle whose tangent equals the result of the equation, tangent of the helix angle of the teeth of the larger gear of the slidable unit, times the pitch radius of the smaller gear of the slidable unit, divided by the pitch radius of the larger gear of the slidable unit, whereby the opposing axial thrusts on the slidable gear unit are balanced when the latter is shifted to a position rendering the smaller gear of the slidable unit effective to drive said two gear crank gear.

5. A driving transmission for a machine tool combining a first helicoidal drive gear; bearing means for supporting said gear against axial movement in either direction; a second intermediate helicoidal gear meshing with said first helicoidal gear; a third helicoidal gear smaller than said second gear secured to and coaxial with said second gear; and a fourth helicoidal gear meshing with said third gear; bearing means for supporting said fourth gear against axial movement in one direction only, said first and second gears constituting a pair and said third and fourth gear constituting a pair, and each of said pairs of gears having the helix angles of the teeth thereon determined by the formula:—

$$\tan \text{ angle } d = \frac{r \tan \text{ angle } B}{R}$$

where angle B = helix angle of the second gear
angle $d$ = helix angle of the third gear
angle R = pitch radius of the second gear
angle $r$ = pitch radius of the third gear thereby to produce a state of axial equilibrium in the said second and third gears.

6. A variable speed driving transmission comprising a helicoidal drive pinion; bearing means for supporting said pinion against axial movement in either direction; two helicoidal driven gears of different sizes; bearing means for supporting said driven gears; a shiftable intermediate helicoidal idler gear unit for transmitting motion from said pinion selectively to either of said driven gears comprising a large gear constantly in mesh with said drive pinion and adapted to mesh selectively with one of the said driven gears and a small gear adapted selectively to mesh with the other of said driven gears; said idler gear being journaled for free rotation and axial movement on an intermediate stub shaft, the helix angle of the teeth of the large gear of said unit being proportioned with respect to the helix angle of the teeth of the small gear of said unit and the direction of helix on said gears being arranged to effect a kinetic balance of the axial thrusts on said intermediate idler gear unit, and an end thrust on said driven gears in the direction of the said supporting bearing means irrespective of which one of said driven gears is being driven.

7. A driving transmission comprising a helicoidal drive pinion; bearing means for supporting said pinion against axial movement in either direction; a helicoidal driven gear; bearing means for supporting same; a two-gear helicoidal gear unit intermediate said pinion and driven gear for transmitting motion from said pinion to said driven gear, said two-gear unit comprising a large gear adapted to mesh with said pinion and a small gear adapted to mesh with said driven gear, the teeth on said pinion and said large gear having a helix angle differing from the angle of the helix of the teeth of said small gear and said driven gear in accordance with the formula $$R \times \tan \text{ angle } d = r \tan \text{ angle } D$$

where R is the pitch radius of the large gear of said unit, $d$ is the helix angle of the small gear of the unit, $r$ is the pitch radius of the small gear of the unit and D is the helix angle of the large gear of the unit to produce a balanced condition of the axial thrusts upon said intermediate gear unit.

8. In a machine tool combining a reciprocable member, power means for reciprocating said member selectively at different speeds including a double crank gear wheel operatively connected with said member, a main driving pinion and an intermediate sliding idler gear unit provided with gears of unequal sizes, one adapted to mesh constantly with said pinion and both movable as to mesh selectively with either gear of said double gear crank wheel thereby to effect a predetermined rate of rotation of said wheel; a thrust bearing for supporting said double gear crank wheel; a stub shaft for supporting said idler unit for free rotation and axial translation, and means for maintaining a state of kinetic equilibrium in said intermediate sliding unit in either if its effective positions comprising helicoidal gear teeth on each of said gears having their helix angles proportioned as between the pairs of mating gears to create a balanced condition in the end thrust reacting upon said intermediate sliding gear irrespective of the position to which said sliding unit is shifted.

WILLIAM F. ZIMMERMANN.